US007529517B2

(12) United States Patent  
Kawaji (10) Patent No.: US 7,529,517 B2  
(45) Date of Patent: May 5, 2009

(54) AUTOMATIC DOCUMENT FEEDER WITH HANDS-FREE FEED STARTING CAPABILITY (75) Inventor: Masahiro Kawaji, Osaka (JP)

(73) Assignee: Kyocera Mita Corporation, Osaka (JP)

(*) Notice: Subject to any disclaimer, the term of this patent is extended or adjusted under 35 U.S.C. 154(b) by 451 days.

(21) Appl. No.: 11/275,975

(22) Filed: Feb. 8, 2006

(65) Prior Publication Data  
US 2006/0177252 A1 Aug. 10, 2006

(30) Foreign Application Priority Data  
Feb. 8, 2005 (JP) ............................. 2005-031588

(51) Int. Cl.  
G03G 15/00 (2006.01)
(52) U.S. Cl. ..................................... 399/371; 399/367
(58) Field of Classification Search ............... 399/371, 399/367  
See application file for complete search history.

(56) References Cited  
U.S. PATENT DOCUMENTS  
2003/0049041 A1* 3/2003 Kobayashi .................. 399/50

FOREIGN PATENT DOCUMENTS  
CN 1374621 A 10/2002  
JP 2003/349979 A 12/2000

* cited by examiner

Primary Examiner—Ren Yan  
Assistant Examiner—Jung H Nam  
(74) Attorney, Agent, or Firm—Global IP Counselors, LLP (57) ABSTRACT A document reading device is disclosed which allows an original document to be read without an operator actuating a start key. If a series of operations are performed, such as loading an original document into a sheet feeding tray after the lapse of a time period "a" from the reading of a previous original document, removing the original document within a predetermined time period "b" after the loading, loading the original document into the sheet feeding tray again within the predetermined time period "b", and causing a document sensor to detect whether the loading of the original document is for a time period that exceeds a predetermined time "c", a request to begin reading the original document will be issued without an operator actuating the start key.

4 Claims, 7 Drawing Sheets

(time range for removing chattering)

Fig. 3A (time range for removing chattering)

This signal should be neglected.

AUTOMATIC DOCUMENT FEEDER WITH HANDS-FREE FEED STARTING CAPABILITY

BACKGROUND OF THE INVENTION

1. Field of the Invention

The present invention relates to original document reading devices. More specifically, the present invention relates to an original document reading device for reading an original document placed on a reading surface of a copying machine, a facsimile device, a scanner, or other similar device.

2. Background Information

An original document reading device for reading an original document is typically incorporated into a copying machine, a facsimile device, a scanner, etc. When an original document is placed on a sheet feeding tray or a document platen and then a start key is actuated, reading of the original document will be started. However, if the same hand is used for holding the original document and for actuating the start key, the operator must move his or her hand to the position of the start key and depress the key after placing the original document in the sheet feeding tray or the document platen, thereby wasting time.

In addition, some devices that permit an operator to use one hand to depress the start key and the other hand to hold the original document have been considered. However, if the other hand is full, an operator has to place the original document on the sheet feeding tray or the document platen, and then has to move his or her hand to the position of the start key. In order to solve such a problem, Japanese Unexamined Patent Publication No. 2000-349979 (in particular, paragraph numbers 0031-0039 and FIG. 3) discloses an image forming device that starts reading an original document if a document sensor detects that the original document has been placed on a document platen.

In the image forming device described in Japanese Unexamined Patent Publication No. 2000-349979, when the presence of an original document is detected on the document platen, the original document will be read, and thus merely placing the original document results in the original document being read. However, the original document will be read even if an operator wants to check the original document before reading, and thus in some cases the reading will be a waste of time because the wrong original document will be read.

Therefore, it is a primary object of the present invention to provide an original document reading device that issues an original document read command without an operator having to actuate a start key.

SUMMARY OF THE INVENTION

According to a first aspect of the present invention, an original document reading device for reading an original document comprises:

a reading member that reads the original document;

an original document feeding member that feeds the original document into the reading member;

a notification member that performs pre-notification that the original document is to be read;

an original document detection member that detects the placement of the original document into the document feeding member; and a control member that causes the original document to be fed into the reading member from the original document feeding member and read by the reading member, if the document detection member detects the placement of the original document into the document feeding member after the notification member has performed the pre-notification.

By placing the original document into the document feeding member after pre-notification that the original document it to be read, it will be possible to request that the original document be read without actuating the start key.

According to a second aspect of the present invention, in the original document reading device of the first aspect, the notification member also functions as the document detection member, and the control member will determine that the pre-notification of original document reading has been performed, if the document detection member detects the placement of the original document into the document feeding member and then does not detect the original documents within a predetermined time period.

According to a third aspect of the present invention, in the original document reading device of the second aspect, the control member causes the document feeding member to feed the original document to the reading member, if the original document was initially not detected in the document feeding member by the document detection member within a predetermined time period, and then the original document was detected in the document feeding member by the document detection member within the predetermined time period.

According to a fourth aspect of the present invention, in the original document reading device of the third aspect, the control member causes the document feeding member to feed the original document into the reading member, if the document detection member has detected that the original document has been placed in the document feeding member for an addition predetermined time period after the lapse of the previous predetermined time period.

According to a fifth aspect of the present invention, in the original document reading device of the third aspect, the control member causes the document feeding member not to feed the original document into the reading member, if the document detection member has detected that the original document has not been placed in the document feeding member within an additional predetermined time period after the lapse of the previous predetermined time period.

According to a sixth aspect of the present invention, in the original document reading device of the first aspect, the notification member is a sensor that is arranged adjacent to the document feeding member, and which serves to detect the placement of the original document in the document feeding device and perform pre-notification of the reading of the original document.

According to a seventh aspect of the present invention, in the original document reading device of the first aspect, the notification member is a notification switch which serves to perform pre-notification of the reading of the original document.

As described above, according to the present invention, by performing pre-notification of the reading of the original document and then setting the original document into the document feeding member, it is possible to request that an original document be read without actuating a start key. This eliminates the need for an operator to move his or her hand to the position of the start key and depress the key, thereby saving time.

Additionally, the operator can begin original document reading with the same hand as the one that was holding the original document, and therefore, the operator can request that reading begin without changing his or her hands, thereby improving working efficiency. In addition, even if the operator holds an original document with one hand and another object with the other hand, it is possible to initiate the reading of the original document by performing an original document reading notification with one hand and then setting the original document into the document feeding member with the same hand.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 3 (A) is a timing chart showing the operation of the document reading device according to the first embodiment of the present invention.

FIG. 3 (B) is a timing chart showing the operation of the document reading device according to the first embodiment of the present invention.

FIG. 6 (A) shows a read start request sensor shown in FIG. 5.

FIG. 6 (B) shows the read start request sensor shown in FIG. 5.

FIG. 6 (C) shows the read start request sensor shown in FIG. 5.

DETAILED DESCRIPTION OF THE PREFERRED EMBODIMENTS

Figure 1:
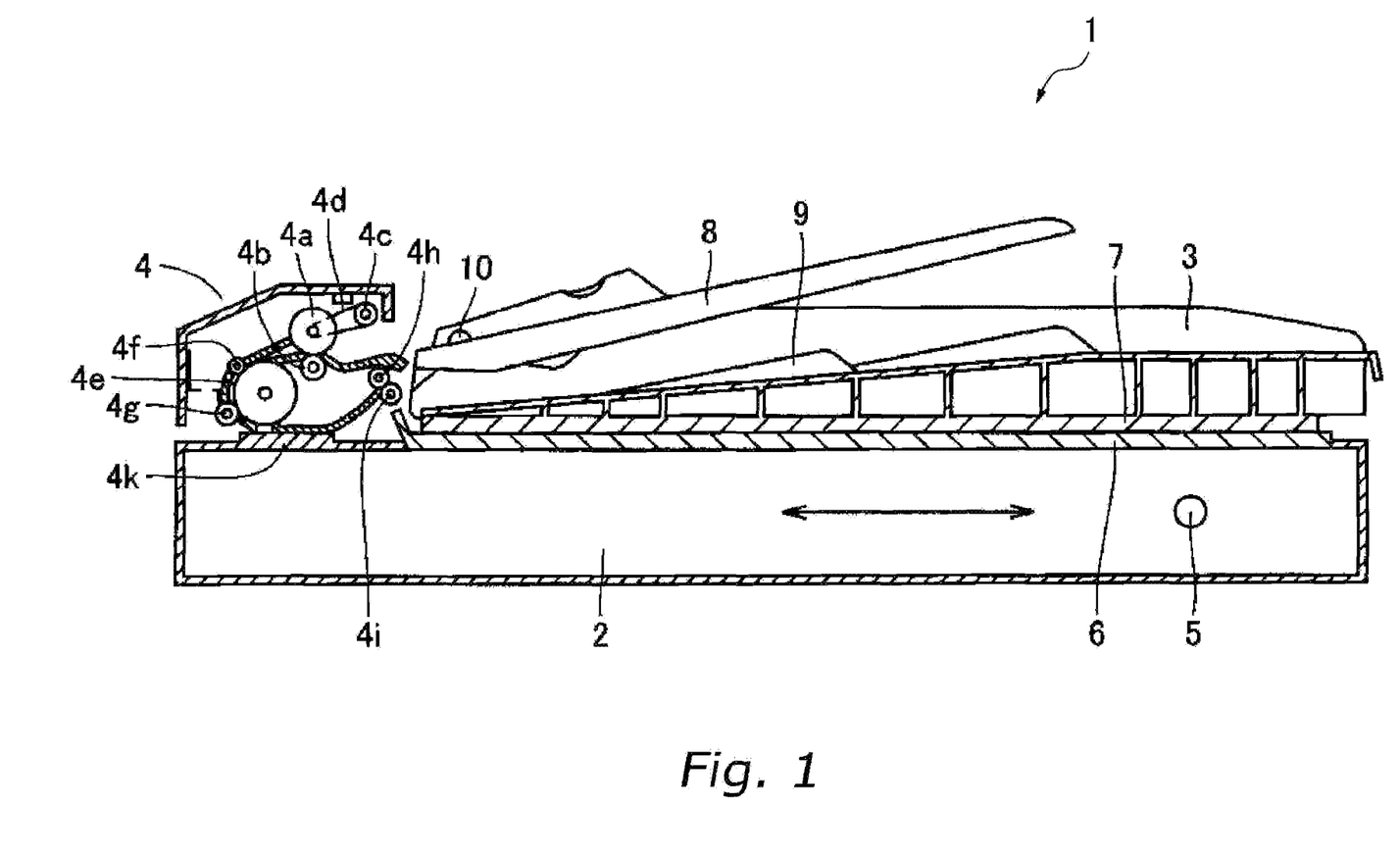
FIG. 1 is a side view of a document reading device according to a first embodiment of the present invention.

FIG. 1 is a side view of an original document reading device 1 according to one embodiment of the present invention. In FIG. 1, the original document reading device 1 includes a housing 2, a pressing lid 3, and a document feeding portion 4 as a document feeding member. The housing 2 incorporates an optical reading system. The optical reading system, showing only a lamp 5 as a light source in FIG. 1, includes an optical system including the lamp 5 and a reflective mirror mounted on a moving frame driven by a motor, and further includes a collective lens and an image pickup device (CCD) for image reading as a reading member within the housing 2. The optical system including the lamp 5 moves in the left-to-right and right-to-left directions shown by the arrow in FIG. 1.

The housing 2 has a transparent cover glass 6 on its top surface as a document platen. The pressing lid 3 has a substrate 7, a sheet feeding tray 8 and a discharge tray 9, and is attached to an edge of the top surface of the housing 2 so as to be opened and closed by a hinge mechanism not shown. The pressing lid 3 acts as an opening and closing plate to perform opening and closing operations against the cover glass 6.

The document feeding portion 4 draws in an original document (not illustrated) placed on the sheet feeding tray 8 and inverts it. The original document is transferred along the feeding portion 4 over a translucent plate 4k, where an image of the original document is read by the optical reading system, and then discharged to the discharge tray 9. The document feeding portion 4 is provided with a feeding roller 4a and a separation roller 4b for drawing the uppermost sheet of a multi-page original document in the sheet feeding tray 8. Also, on a lateral side (rightward in FIG. 1) of the feeding roller 4a, a feed assist roller 4c is provided to which a driving force is transmitted from the feeding roller 4a via a belt 4d.

When the feeding roller 4a rotates, the driving force is transmitted to the feed assist roller 4c via the belt 4d so that the feed assist roller 4c and the feeding roller 4a rotate in the same direction. The feed assist roller 4c moves down to be brought into contact with the uppermost sheet of the original document in the sheet feeding tray 8 to assist the feeding roller 4a in feeding. Downstream of the feeding roller 4a and the separation roller 4b are provided a transfer roller 4e and driven rollers 4f and 4g.

After being fed into the document feeding portion 4 by the feeding roller 4a and the separation roller 4b, the original document is transferred and pinched between the transfer roller 4e and the driven rollers 4f and 4g, and then inverted so as to pass over the translucent plate 4k. Through the translucent plate 4k, the original document image is read by the optical reading system. After passing over the translucent plate 4k, the original document is transferred through a pair of discharge rollers 4h and 4i and is discharged into the discharge tray 9 from an outlet 4j.

At the end of the sheet feeding tray 8, a document sensor 10 is provided as a document detection member in order to detect the presence of an original document. The document sensor 10 employs a photoelectronic sensor, for example. The document sensor 10 as a document detection member also functions as a notification member in order to command the reading of the original document.

Figure 2:
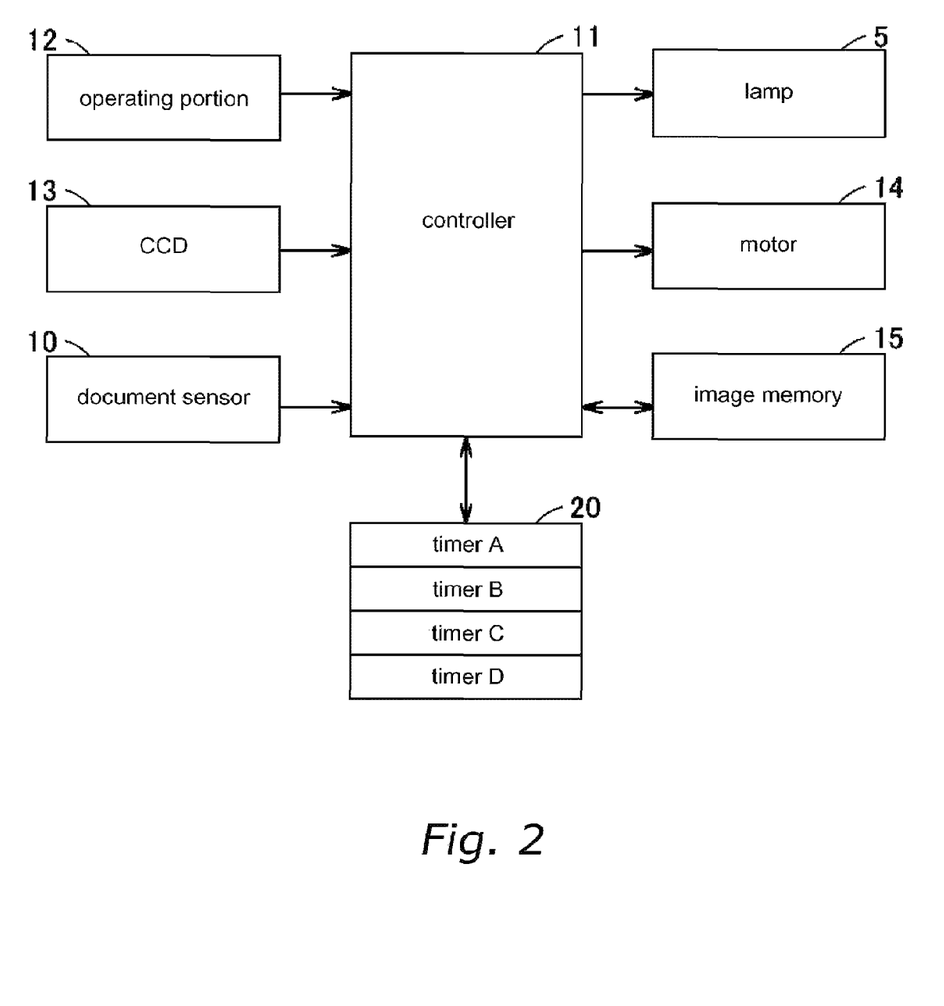
FIG. 2 is a schematic block diagram of the document reading device according to the first embodiment of the present invention.

FIG. 2 shows a schematic block diagram of the document reading device in one embodiment of the present invention. A controller 11 is connected with the lamp 5 and the document sensor 10 shown in FIG. 1, and is also connected with an operating portion 12, a CCD 13, a motor 14, and an image memory 15. The operating portion 12 includes a start key and keys for setting the resolution and reduction ratio during reading. In order to display the set resolution, a display portion may be provided as necessary.

Figure 3A:
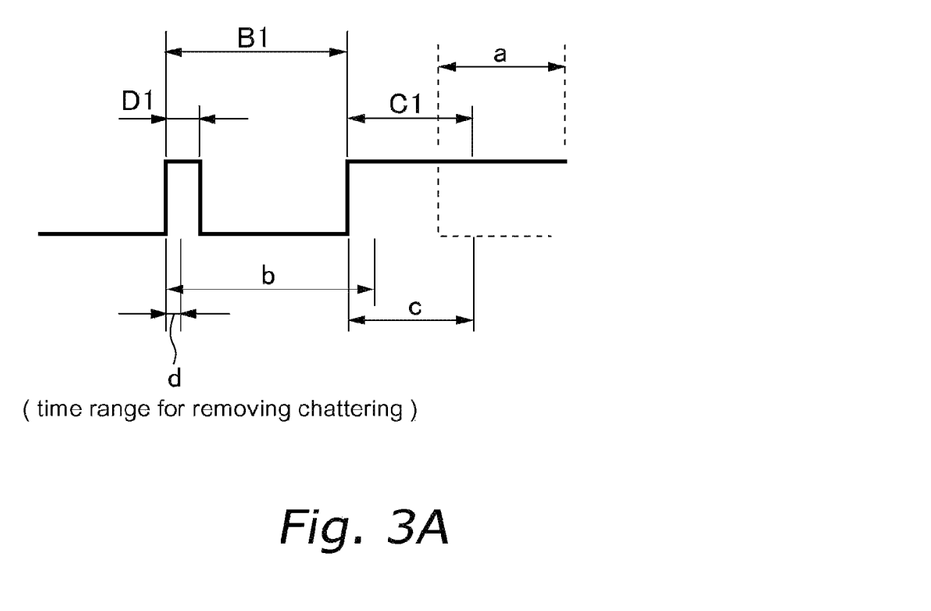
Figure 3B:
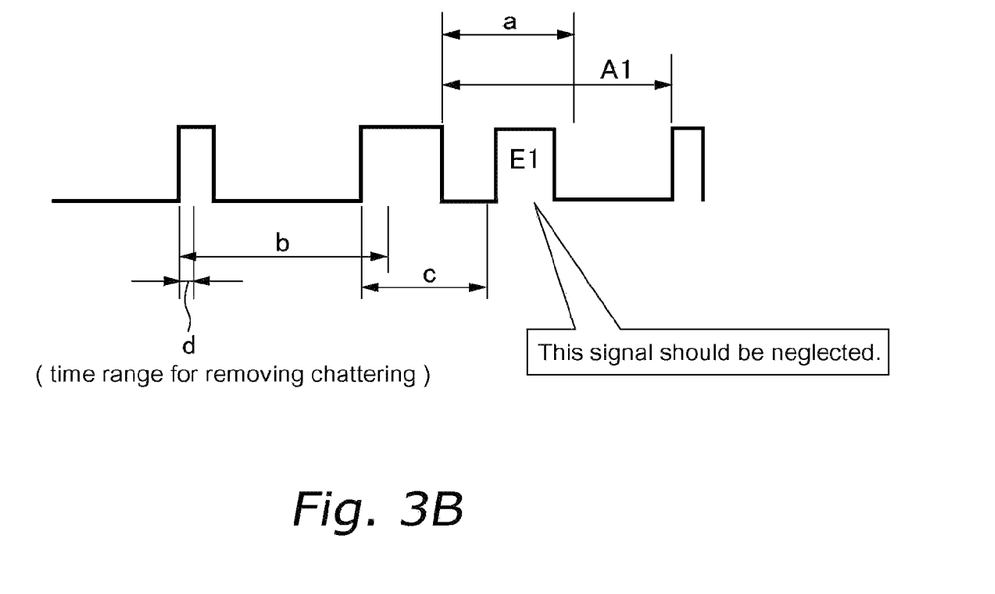

The CCD 13 reads an original document image, and the document sensor 10 detects, as described in FIG. 1, the placement of an original document in the sheet feeding tray 8. The lamp 5 irradiates the reading surface of the original document. The motor 14 drives the document feeding portion 4 as described in FIG. 1. The image memory 15 stores the image data of the original document read by the CCD 13. The timer 20 includes timers A, B, C, and D, and detects the timing shown in FIGS. 3 (A) and 3 (B) and described below.

If a multifunction machine combining functions of a copying machine, scanner, and FAX incorporates the original document reading device shown in FIG. 2, the multifunction machine will be provided with a printer, a communication unit, and the like.

In one embodiment of the present invention, with the original document reading device 1 in an idle state in which original documents are not read thereby, the original document reading device 1 will be pre-notified that an original document is to be read by first placing an original document into the sheet feeding tray 8 and then removing the original document once (before being read), and then the reading of the original document will be started by loading the original document once again into the sheet feeding tray 8. This allows a request to begin reading an original document to be given without actuating the start key.

The initiation of original document reading will be described in detail with reference to FIGS. 3 (A) and 3 (B). FIGS. 3 (A) and 3 (B) illustrate the operation of an original document reading device in one embodiment of the present invention. The solid lines shown in FIGS. 3 (A) and 3 (B) show detection outputs of the document sensor 10.

The time B1 is a time period between the first loading of the original document and the second loading of the original document, and is defined by the timer B. The time C1 is a time period between the second loading of the original document and a determination that the reading of the original document will begin, and is defined by the timer C. The time D1 is a time period during which the first loading of the original document is carried out, and is defined by the timer B and the timer D.

The times "b", "c", and "d" are time ranges for defining the times B1, C1 and D1, and the time "b" is a time range during which the second loading of the original document can be detected. After the first loading of the original document is determined, it will be determined that the second loading of the original document has been carried out if the second loading of the original document is detected before the time "b" counted by the timer B expires.

The time "c" is a time range between the point at which it is determined that the second loading of the original document has been performed and the point at which it is determined that reading is to begin. If the original document continues to be detected until the time "c" counted by the timer C expires, as shown in the solid line in FIG. 3 (A), the original document will begin to be read. The time "d" is a time range during which chattering is eliminated, and is counted by the timer D. Within the time range indicated by the time "d", the detection of the presence or absence of the original document will be ignored.

FIG. 3 (B) shows a case in which the original document is removed before the time "c" counted by the timer C expires, as shown in the dotted line in FIG. 3 (A). The time A1 is a time period between the loading of the original document and the start of document re-detection, and is defined by the timer A. The time "a" is a time range for defining the time A1, and the original document detection is not carried out until the time "a" counted by the timer A expires. Accordingly, E1 in FIG. 3 (B) is ignored.

Figure 4:
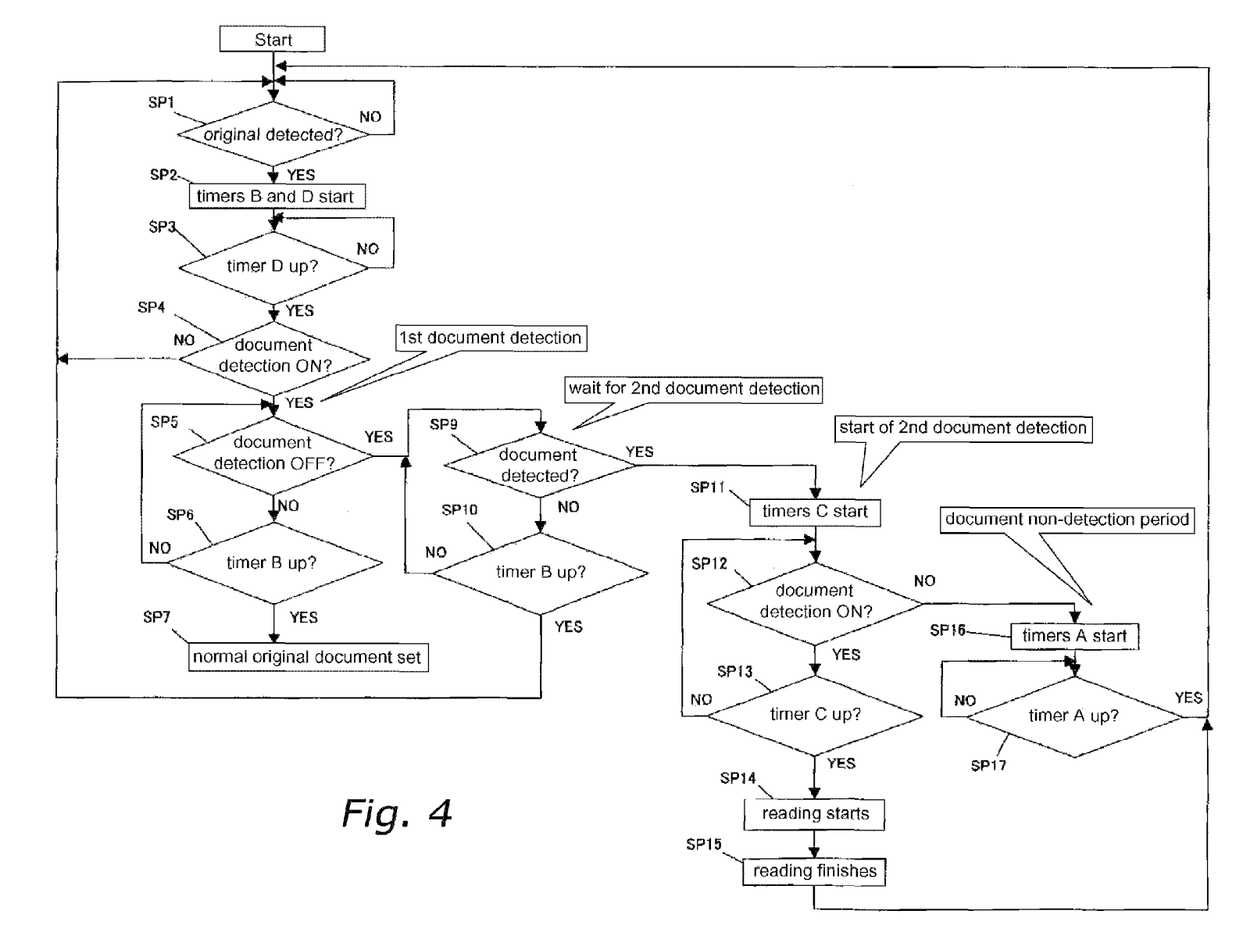
FIG. 4 is a flowchart showing the operation of the document reading device according to the first embodiment of the present invention, from the point at which an original document is placed therein to the point at which the reading of the original document is completed.

FIG. 4 is a flowchart showing the operation from the loading of the original document to the beginning of original document reading by the original document reading device in one embodiment of the present invention.

The controller 11 determines whether or not an original document has been detected by the document sensor 10 in step SP1, and if it is determined that the original document has been placed in the sheet feeding tray 8 (by means of the document sensor 10), the controller 11 proceeds to a first original document detecting operation in step SP2 to start the timers B (time "b") and D (time "d").

In step SP3, a signal detection by the document sensor 10 is not performed until the time "d" to be counted by the timer D expires, in order to prevent the document sensor 10 from accidentally detecting a signal due to chattering. If the timer D finishes counting up, the process proceeds to step SP4 to determine whether or not an original document has been detected during the count-up. If the original document is not detected (No in step SP4), it is determined that the original document has been removed, or that a false detection has occurred in the document sensor 10, or the like, and therefore, the process returns to step SP1.

If the original document is detected (YES in step SP4), it is determined that the first detection has been carried out, and then removal of the original document will be detected in step SP5. Here, the removal of the original document will be detected until the time "b" to be counted by the timer B expires (from NO in SP5 to NO in SP6, and then to SP5). However, if the timer B finishes counting up with the original document still loaded in step SP6 (YES in step SP6), it is determined that a normal original document placement has occurred. That is, similar to the conventional technology, it is determined that reading has been requested by actuating the start key, and the reading process is performed in response thereto. If the original document is removed without operating the start key, the process returns to step SP1.

If the removal of the original document is detected before the timer B finishes counting up in step SP6 (YES in step SP5), a second original document detection is started in step S9. Note that it may be accidentally determined that a request to begin reading has been made when there is a long period of time between the first original document detection and the second original document detection, and therefore, the detection of the original document has to continuously be performed until the time "b" counted by the timer B expires (from NO in step SP9 to NO in step SP10, and then to step SP9).

If the original document is not detected before the time "b" to be counted by the timer B expires (YES in step SP10), it is determined that the reading of the original document has been suspended, and then the process returns to step SP1. If the original document is detected before the time "b" counted by the timer B expires (YES in step SP9), the process proceeds to step SP11.

Note that the time "d" counted by the timer D is defined as 100 milliseconds, for example, and the time "b" counted by the timer B is defined as 1000 milliseconds, for example.

In step SP1, the timer C starts counting the time "c". The time "c" is preferably in the range of 1000 to 2000 milliseconds. Then, it is determined whether or not the original document continues to be detected until the timer C finishes counting up (from YES in step SP12 to NO in step SP13, and then to step SP12). If the timer C finishes counting up with the original document loaded (YES in step SP13), it is determined that the original document has been placed in the sheet feeding tray 8, preparations for reading are finished in step SP14, and then the initiation of reading is requested.

That is, the controller 11 outputs a request to read the original document in order to drive a motor 14 so that the document feeding portion 4 feeds the original document placed on the sheet feeding tray 8, and the CCD 13 reads the fed original document. The image data of the original document read by the CCD 13 is stored in the image memory 15. The image data stored in the image memory 15 is printed by a printer, or output via a communication unit as necessary. Then, after completion of reading in step SP15, the process returns to step SP1.

If the original document is removed before the timer C finishes counting up (NO in step SP12), the timer A starts counting the time "a" for allowing the next original document to be read in step SP16. It is determined whether or not the timer A finishes counting the time "a" in step SP17. If it is not finished, the process returns to step SP17, while if it is finished, the process returns to step SP1.

According to this embodiment, as described above, a series of operations such as loading an original document in the sheet feeding tray 8 first, removing the original document once, and then loading the original document again, permits an operator to pre-notify the device that an original document is to be read, and request that the reading of the original document be initiated without actuating the start key. This eliminates the need to move one's hand to the position of the start key and depressing the key, thereby eliminating a waste of time.

Additionally, the operator can operate the start key with single hand, that is, request that reading be initiated without shifting the original document from one hand to the other, thereby improving work efficiency. Also, removal of the original document once after loading the original document into the sheet feeding tray 8 allows the operator to check the original document, thereby eliminating the possibility of accidentally reading the original document. Furthermore, even when the operator holds an original document with one hand and another object with the other hand, a request to read the original document can be made by loading and removing the original document into and from the sheet feeding tray 8 with one hand.

Figure 5:
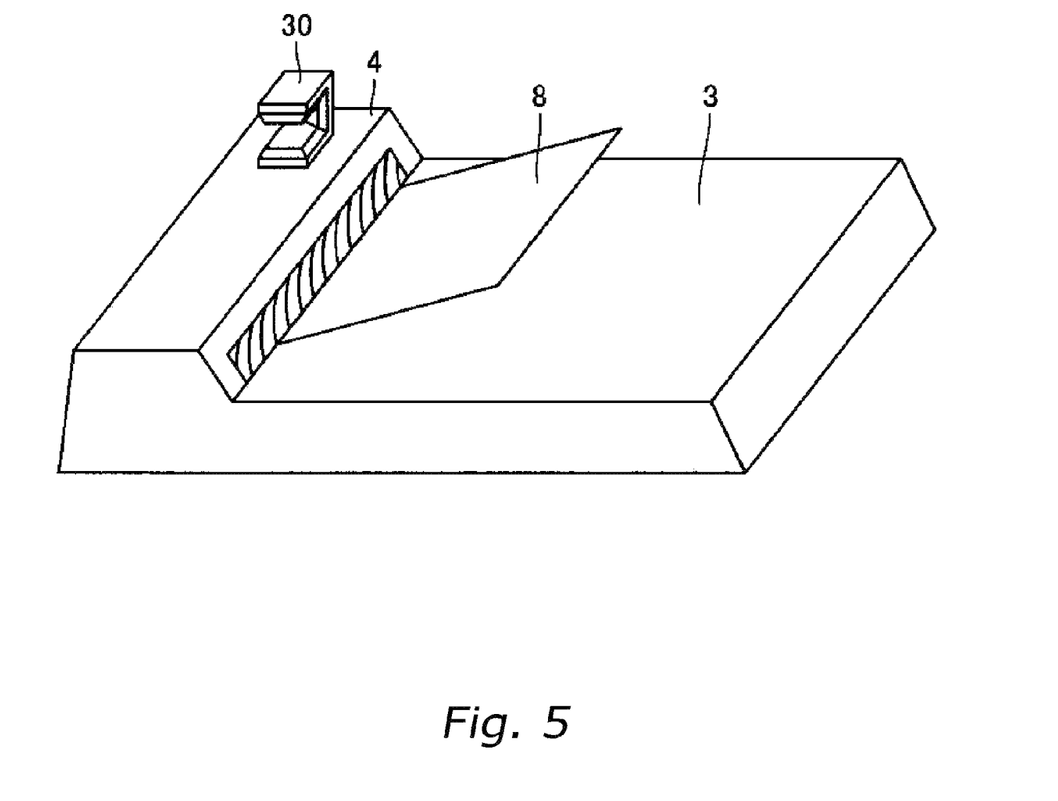
FIG. 5 is a perspective view of a document reading device according to a second embodiment of the present invention.
Figure 6A:
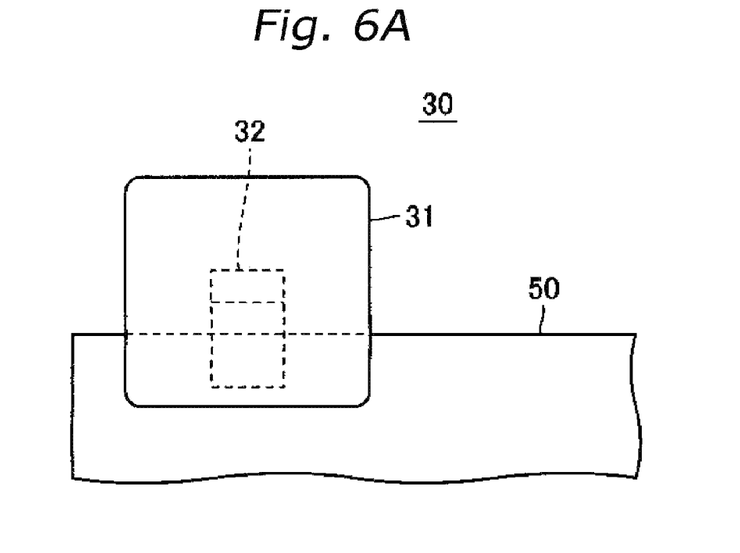
Figure 6B:
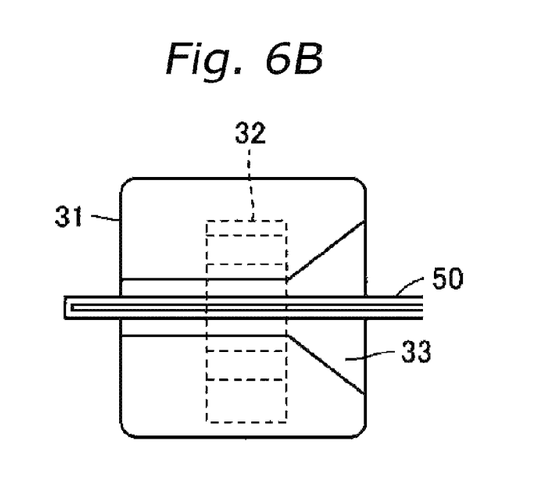
Figure 6C:
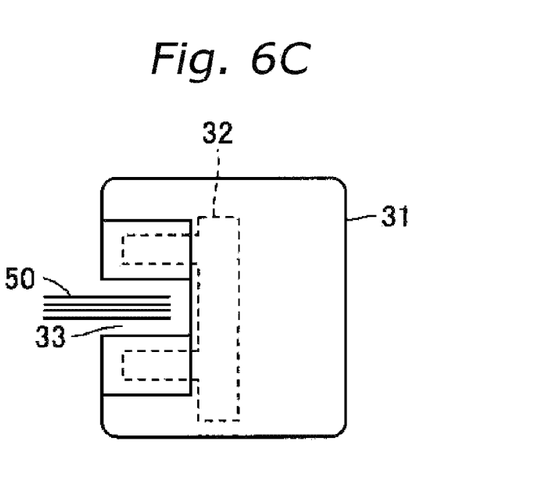

FIG. 5 shows an original document reading device according to another embodiment of the present invention, and FIGS. 6 (A) to (C) show the details of a read start command sensor that is shown in FIG. 5. FIG. 6 (A) is a top view, FIG. 6 (B) is a front view when viewing FIG. 5 from the front, and FIG. 6 (C) is a right side view.

In FIG. 5, the original document reading device includes a pressing lid 3, a document feeding portion 4, and a sheet feeding tray 8 similar to FIG. 1, and is provided with a read start request sensor 30 as a notification member on the document feeding portion 4. In the embodiment shown in FIG. 1 to FIG. 4, by loading an original document in the sheet feeding tray 8 and then removing it, the original document reading device 1 will be notified that an original document is to be read. In contrast, in this embodiment, the reading of an original document will be requested by causing the read start request sensor 30 to read a portion of an original document, and thereby notify the original document reading device that an original document is to be read. By loading the original document into the sheet feeding tray 8 again, reading of the original document will be requested.

The read start request sensor 30 includes a sensor case 31, and the sensor case 31 incorporates a photo interrupter 32 for detecting the loading of an original document 50. The sensor case 31 is provided with a groove 33 that allows the original document 50 to be loaded between a light-emitting diode and a photoconductor diode of the photo interrupter 32. At the right side of the groove 33, a wider opening is formed as shown in FIG. 6 (B) so as to make it easy to load the original document 50.

Figure 7:
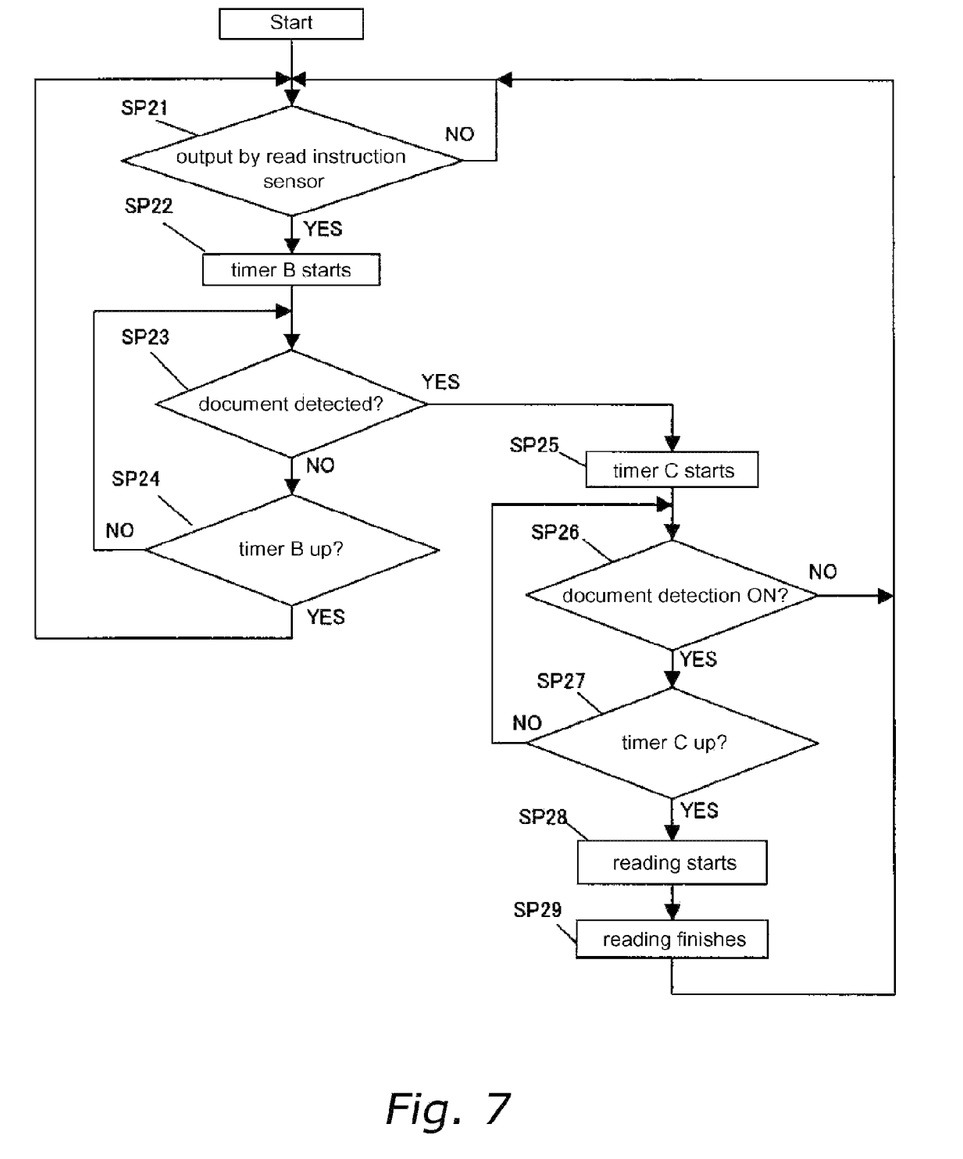
FIG. 7 is a flowchart showing the operation of the second embodiment, in which an original document read request is made by utilizing the read start request sensor shown in FIG. 5 and FIGS. 6 (A) to 6 (C).

FIG. 7 is a flowchart showing a method by which the reading of an original document can be requested by using the read instruction sensor shown in FIG. 5 and FIGS. 6 (A) to 6 (C). When an operator wants the original document reading device to read an original document 50, he or she loads the original document 50 into the groove 33 of the read start request sensor 30 in order to cause the photo interrupter 32 to read it, and then loads the original document 50 into the sheet feeding tray 8.

The controller 11 shown in FIG. 2 determines whether or not the original document 50 is detected by the read start request sensor 30 in step SP21 shown in FIG. 7, and, if the controller 11 determines that the original document 50 is detected, it activates the timer B to start counting the time "b" in step SP22.

In step SP23, it is determined whether or not the loading of the original document 50 into the sheet feeding tray 8 is detected by the document detection sensor 10. However, when it takes a long time between the point at which the original document 50 is detected by the read start request sensor 30 and the point at which the loading of the original document 50 into the sheet feeding tray 8 is detected by the original document detection sensor 10, it may be accidentally determined that the start of reading has been requested. Thus, the detection of the original document is continued until the time "b" counted by the timer B expires (from No in step SP23 to NO in step SP24, and then back to step SP23). If no original document is detected before the time "b" counted by the timer B expires (YES in step SP24), it is determined that reading of the original document has been suspended, and the process returns to step SP21. If an original document is detected before the time "b" counted by the timer B expires (YES in step SP23), the process proceeds to step SP25.

In step SP25, the time "c" is counted by the timer C. Note that the timer B and the timer C included in the timer 20 shown in FIG. 2 are utilized in this embodiment. It is preferable that the time "c" is selected to be in the range of 1000 to 2000 milliseconds, for example. Then, it is determined whether or not the original document continues to be detected until the timer C finishes counting up (from Yes in step SP26 to NO in step SP27 , and then to step SP26). If the timer C finishes counting up with the original document loaded (YES in step SP27), it is determined that the original document is set into the sheet feeding tray 8 and prepared to be read in step SP28, and thus the start of reading has been requested.

When the original document is removed before the timer C finishes counting up (NO in step SP26), the process returns to step SP21.

Consequently, in this embodiment as well as in the embodiments shown in FIG. 1 to FIG. 4, it is possible to request that an original document be read without actuating the start key, by notifying the original document reading device 1 in advance that an original document is to be read.

Note that a switch for notifying the original document reading device 1 that an original document is to be read may be provided in place of the read start request sensor 30 shown in FIG. 5. Specifically, the original document reading device 1 may be notified in advance that an original document is to be read by operating the switch before loading the original document into the sheet feeding tray 8, and thereafter, loading the original document into the sheet feeding tray 8 to be read. Conventionally, a start key is provided at a position nearer to the original document loading side of the sheet feeding tray 8 for better operability. However, the adoption of the embodiment eliminates the possibility of less operability regardless of where the start key is positioned.

Any terms of degree used herein, such as "substantially", "about" and "approximately", mean a reasonable amount of deviation of the modified term such that the end result is not significantly changed. These terms should be construed as including a deviation of at least ±5% of the modified term if this deviation would not negate the meaning of the word it modifies.

This application claims priority to Japanese Patent Application No. 2005-031588. The entire disclosure of Japanese Patent Application No. 2005-031588 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. An original document reading device, comprising:
   a sheet feeding tray being configured to feed sheets;
   a reading member being configured to read the sheets;
   an original document feeding member being configured to feed the sheets into the reading member;
   an original document detection member being configured to detect the placement of the sheets in the sheet feeding tray, the original document detection member being configured to perform pre-notification, pre-notification being the detecting of a first placement of the sheets in the sheet feeding tray, and a removal of the sheets from the sheet feeding tray within a first predetermined time period; and
   a control member being configured to determine that the pre-notification has been performed, and that causes the sheets to be fed into the reading member from the sheet feeding tray if it is determined that the original document detection member has performed the pre-notification and the original document detection member detects a second placement of the sheets within the first predetermined time period.

2. An original document reading device according to claim 1, wherein the control member causes the document feeding member to feed the sheets to the reading member and determines that the second placement of the sheets has been detected, if the sheets were initially not detected in the document feeding member by the document detection member within the first predetermined time period, and then the sheets were detected in the document feeding member by the document detection member within the first predetermined time period.

3. An original document reading device according to claim 2, wherein the control member causes the document feeding member to feed the sheets into the reading member, if the document detection member keeps detecting that the sheets have been placed in the document feeding member for a second predetermined time period after the lapse of the first predetermined time period.

4. An original document reading device according to claim 2, wherein the control member causes the document feeding member not to feed the sheets into the reading member, if the document detection member has detected that the sheets have not been placed in the document feeding member within an additional predetermined time period after the lapse of the previous predetermined time period.

* * * * *